Aug. 29, 1972  R. H. KROCK ET AL  3,687,737
METHOD OF MAKING BERYLLIUM-ALUMINUM-COPPER-SILICON
WROUGHT MATERIAL
Filed July 17, 1970

INVENTORS
RICHARD H. KROCK
WILLIAM J. RICHMOND
BY
Henry W. Cummings
ATTORNEY

United States Patent Office 3,687,737
Patented Aug. 29, 1972

3,687,737
METHOD OF MAKING BERYLLIUM-ALUMINUM-COPPER-SILICON WROUGHT MATERIAL
Richard H. Krock, Weston, and William J. Richmond, Reading, Mass., assignors to P. R. Mallory & Co. Inc., Indianapolis, Ind.
Filed July 17, 1970, Ser. No. 55,781
Int. Cl. C22f *1/16*
U.S. Cl. 148—2
20 Claims

ABSTRACT OF THE DISCLOSURE

A method of producing wrought material containing beryllium and aluminum and at least one element selected from copper, silicon, zinc and nickel comprising: forming a casting of said material in a mold having high thermal conductivity material; applying a protective metallic coating to said casting; heating the coated casting at a temperature of 600 to 950° F. for a period of 5 to 100 hours; extruding the heated casting at a rate of about 13 to 60 inches per minute; removing the jacket from the extruded casting; heating the extrusion at a temperature of 900 to 975° F. for a period of time of 12 hours to 1 week; and rolling the heated extrusion at a total reduction of 10 to 98%.

---

Previous attempts at preparing wrought products, sheet, plate, rod, bar made of beryllous-aluminum alloys have not been successful on a commercial basis because of the relatively brittle nature of the alloy. This brittleness to date has made working the material very difficult.

In patent application Ser. No. 873,635, filed Nov. 3, 1969, now abandoned, assigned to the same assignee as the present application a process of refining the microstructure is disclosed involving forming castings of beryllium-aluminum alloys and attaching the castings to an electrode, partly melting the electrode while rotating the same, thereby causing droplets to fly from the electrode; and cooling the droplets to form particulate beryllium-aluminum material with a fine grain structure.

While this process is successful in refining the grain structure and reducing the brittle nature of the material, the formation of wrought products by rolling or extruding has still been difficult even with this refined grain structure.

It is an object of the present invention to provide wrought products from beryllium-aluminum material.

It is the object of the present invention to provide a process for providing beryllium-aluminum sheet material.

It is the object of the present invention to provide a process for providing beryllium-aluminum plate material.

It is the object of the present invention to provide a process for providing beryllium-aluminum rod material.

It is the object of the present invention to provide a process for providing beryllium-aluminum bar material.

It is another object of the present invention to provide beryllium aluminum wrought material with increased elongation.

It is another object of the present invention to provide beryllium aluminum wrought material which has substantially the same properties in the transverse direction as in the longitudinal direction.

It is another object of the present invention to provide a process which does not require the use of an intermediate matrix refinement step.

It is another object of the present invention to provide a process which is suited to commercial use on conventional equipment.

Other objects will be apparent from the following description and drawing.

Figure 1:
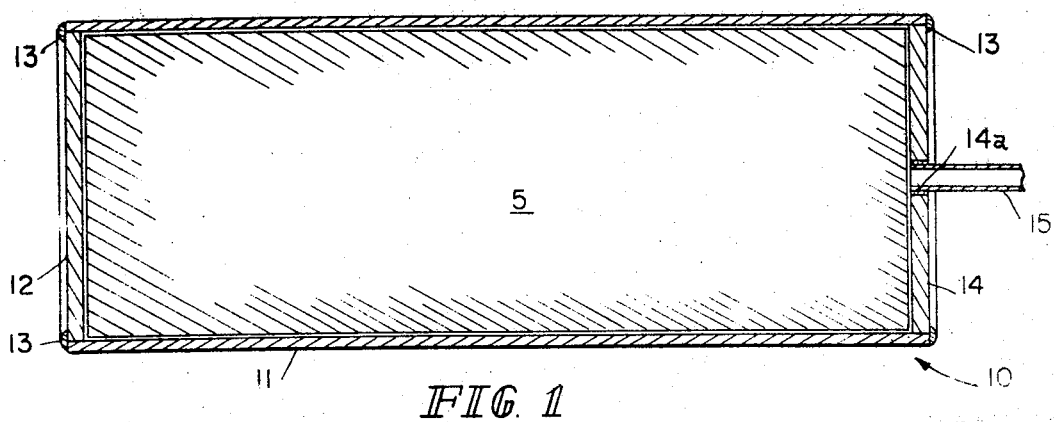
FIG. 1 is a sectional view and FIG. 2 is an end view of an evacuation jacket which can be utilized in the present invention.

The alloy composition to be utilized in accordance with the present invention comprises beryllium in an amount of about 60 to about 85% by weight; aluminum 14 to about 40% by weight. Additionally at least one of the following additional elements is added in approximately the composition listed: Si 0.1–5%; Cu 0.1 to 5%; Zn 0.1–5%; and Ni 0.1–5%. Impurities are preferably each not above about 0.1%, total impurities not above about 1%.

The preferred composition consists essentially of about 60 to about 85% by weight beryllium and about 14 to about 40% by weight aluminum; about 0.1 to 5% silicon and about 0.1 to 5% copper with zinc and nickel not present in amounts above impurity levels. The most preferred composition consists essentially of about 70 to 80% beryllium; about 20 to 30% aluminum; about 1 to 5% copper and about 0.2 to 2.5% silicon.

The first step in the process is to form castings of this alloy composition. The method of casting may involve the use of an alkali or alkaline earth halide flux as described in application Ser. No. 667,910, filed Sept. 15, 1967, Pat. No. 3,558,305. Alternatively, the casting may be formed in accordance with application Ser. No. 832,439, filed June 11, 1969, Pat. No. 3,548,915, wherein the melting chamber is first evacuated and then back filled with an inert gas such as argon prior to casting. Both of these applications as well as the said application Ser. No. 873,635 are hereby incorporated into the present application by reference and expressly made a part hereof.

A third method of forming the casting is to form a casting in the shape of a consumable electrode by any known method, for instance by either of the methods as described in said Ser. No. 667,910 or 832,439 and then use this casting as a consumable arc electrode in a consumable arc casting process. In consumable arc casting a DC voltage is employed between the consumable electrode and the casting and an arc is struck therebetween. For example voltage utilized is from about 40 to about 100 volts and the cuurent about 400 to 800 amps. The mold must be made of a material which is highly thermally and electrically conductive. Non-limiting examples of such materials are copper, copper alloys and graphite. Copper and copper alloys are preferred.

In the event that the casting process is carried out according to Ser. No. 667,910 and/or Ser. No. 832,439 the preferred mold material is a highly thermally conductive material. Among the mold materials which may be used are: graphite, copper or copper alloys, iron or steel.

In general the mold will be liquid i.e. water cooled but air cooling may also be utilized where a less rapid cooling rate can be tolerated. Air cooling usually results in a less fine microstructure in comparable casting section sizes. The smallest cross sectional dimension in the casting may be up to six inches and higher, but preferably the smallest dimension is below about three inches.

The mold is preferably shaped so that the casting is of cylindrical shape. However, square and rectangular castings can also be utilized in the process as well as elliptical and hyperbolic cross sections. The casting may be of any desired length; however, for casting convenience the casting is usually not longer than 6 feet.

The next step is to clean up the castings to remove surface imperfections in the castings. This is preferably done by machining, for example on a conventional lathe having a conventional machining tool i.e. tungsten carbide/cobalt. Machining lathes of this type are conventional and the lathe per se and its cutting tool form no part of this invention. The machining operation also is utilized to get the castings to tolerances as close to the desired shape as practical. Exemplary dimensional tolerances are +3 to +10 thousandths. If the casting is sufficiently close to tolerance and sufficiently free of surface imperfections the machining step may be eliminated.

After the machining operation a layer of protective metal is applied to the casting. This material must have high thermal conductivity; be sufficiently strong to withstand extrusion pressures and sufficiently ductile to flow. A relatively high melting point about above 1000° C. is preferred. Silver, gold and their alloys may be used but copper and copper alloys i.e. brass, bronze, are preferred. This layer can be applying a coating of protective metal for example by plating. If the casting is placed in a jacket, the jacket preferably is of slightly larger size, for example of 10 to 20 thousandths of an inch larger.

In the event that a plating solution is employed conventional plating solutions may be utilized for this purpose including for example cyanide, sulphate, and halide as the negative ion in solution.

Figure 2:
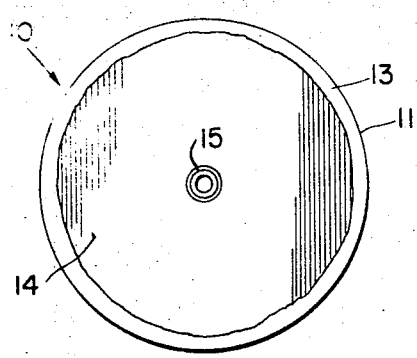

The preferred procedure is to place the casting in the metal jacket, preferably copper, having an evacuation tube. An exemplary construction of this is shown in FIGS. 1 and 2.

The jacket and evacuation tube is designed generally as 10 and includes a hollow can portion 11. One method of assembly includes first affixing end plate 12 to the can preferably by welding or brazing 13. Casting 5 is then placed therein. Front plate 14 having an opening 14a into which evacuation tube 15 has previously been affixed is then put in place, preferably by welding or brazing. The assembly 10 including casting jacket and evacuation tube is now ready for further processing.

The evacuation procedure is carried out at a temperature from 600 to 950° F. for a period of 5 to 100 hours. This removes gaseous impurities and makes the surface substantially free of such impurities. The evacuation tube is sealed off by heating the tube and then hammer welding, or other appropriate sealing. Preferably the casting is maintained under vacuum during sealing.

Alternatively, if desired, gaps can be left in the welds or brazes and the evacuation tube dispensed with. However, the surface is not as free of impurities according to this latter procedure.

In the event the metallic coating has been applied by plating, the hot evacuation step may be carried out in an evacuated chamber, or alternatively, it may be dispensed with, with some sacrifice in impurities content of the surface.

If the facilities permit it, the preferred method after heating the casting during hot evacuation is to move the hot casting with the copper jacket directly into the extrusion operation.

Figure 3:
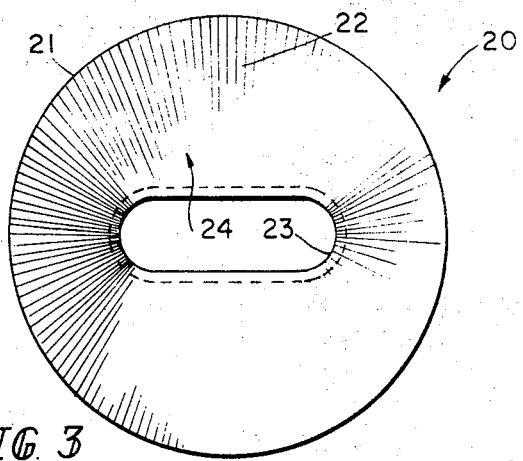
FIG. 3 is a front view, FIG. 4 a top view and FIG. 5 a side view of extrusion dies which may be utilized in the present invention.
Figure 4:
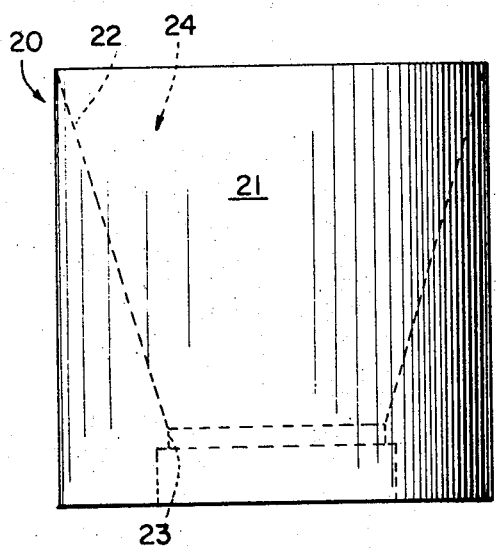
Figure 5:
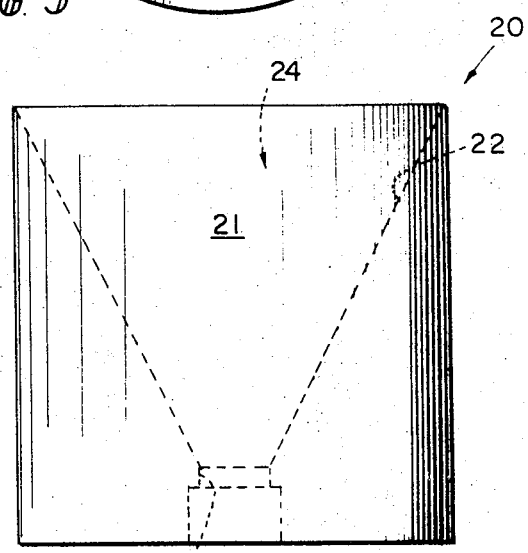

However many plants would not have the facilities to do this and if this is the case, the casting may be cooled and stored. If this is the case, it should then be reheated to a temperature of 600 to 950° F. prior to extrusion. As shown in FIGS. 3–5, the extrusion die 20 may be made of conventional die materials, preferably known die steels. It is preferably rectangular and comprises a body portion 21 and shaping surfaces 22. These surfaces include radius curves 23 and an integral cone 24 for streamline flow.

The extrusion rate should be between 13 and 60 inches per minute with an amount of reduction of area of 8:1 to 24:1. In other words the ratio of inlet diameter squared to outlet diameter squared should be from about 8 to about 24. Similar principles would govern the design of dies of other casting cross sections, such as square or rectangular.

After extrusion the metal jacket is removed from the casting. This may be done by various means, for example by machining, for example on a conventional lathe of the type described above, having a tungsten carbide/cobalt or other appropriate tool. A second method involves removing the metal coating by etching or pickling, for example by placing the extrusion in an acid bath. Exemplary acids include nitric, sulphuric, halides, hydrochloric and mixtures thereof. Basic solutions may also be used, including solutions of sodium hydroxide, potassium hydroxide, ammonia hydroxide, etc. Other pickling solutions will be apparent to those skilled in the art.

After jacket removal the casting is heated for a period of 12 hours to 1 week or longer at a temperature of from 900 to 975° F. This heat treatment is desirable in order to relieve stresses induced during extrusion and to achieve some microstructural uniformity. The heat treatment is preferably carried out in a vacuum or an inert gas such as argon, helium or nitrogen. However, it also may be carried out in air if impurity tolerances are not too high.

After the heat treatment a rolling operation is carried out. Conventional rolls will be utilized appropriately shaped to obtain the desired product, i.e. plate or sheet, or bar or rod. The amount of reduction before annealing is about 20 to about 80%. Preferably the amount of reduction is from about 20 to 40%, before the first anneal. A reheat of 3 to 10 minutes to 900 to 970° F. between each pass is preferably carried out. During the rolling operation the rolls are preferably at an elevated temperature, preferably at a temperature of 250 to 350° F. The roll should be lubricated with a dry lubricant for example a colloidal graphite suspension in an inert liquid carrier such as "DFG" sold by Miracle Powder Products Corp., Cleveland, Ohio. Rolling should be carried out from 10 to 30 mils per pass for plate thickness greater than ¼" and for sheet. For thin sheet this is continued until the product is 100 mils thick. For still thinner sheet reduction should be at a rate of 5 to 10%; preferably 8 to 10%. Similar adjustments should be made in processing bar (Diameter above ½") and wire.

Next a heat treatment of 900 to 975° F. is carried out for a period of about 20 to 40 hours.

If a uniform texture is desired in sheet or plate, after the heat treatment unidirectional rolling cross the extrusion direction sufficient to balance the texture is carried out. Cross rolling is carried out with approximately a 90° directional change preferably being carried out with each pass. Between each pass there should be a reheat to a temperature of 950 to 1050° F. for about 3 to 10 minutes. However, there may be two and even three passes in one direction followed by a nearly equal number of passes in a direction approximately 90° with respect to the previous pass. Preferably the rolling is carried out at 90° change every pass. This treatment results in a balanced texture and a product having substantially uniform properties in either direction.

Sheet produced by this process may be 20 mils and thicker. Sheet and plate may be as wide and as long as equipment permits.

The resulting properties of this process include tensile strength of 50,000 to 70,000 p.s.i., yield strength of 40,000 to 60,000 p.s.i., and elongation of about 10 to 20%. With appropriate cross rolling of sheet and plate these properties are obtained in the transverse direction as well as the longitudinal so that the product is substantially of a balanced texture.

We claim:

1. A method of producing wrought material containing 60–85% beryllium and 14–40% aluminum and at least one element selected from copper, silicon, zinc and nickel comprising:

forming a casting of said material in a mold made of high thermal conductivity material;

applying a protective metallic coating selected from the group consisting of silver, silver alloys, gold, gold alloys, copper and copper alloys to said casting;

heating the coated casting at a temperature of 600 to 950° for a period of 5 to 100 hours;

extruding the heated casting at a rate of about 13 to 60 inches per minute with a reduction of area of from about 8:1 to about 24:1;

removing the jacket from the extruded casting;

heating the extrusion at a temperature of 900 to 975° F. for a period of time of 12 hours to 1 week; and rolling the heated extrusion at a total reduction of 10 to 98%, during which rolling the extrusion is heated to a temperature within the range of about 900 to about 975° between passes during rolling.

2. A method according to claim 1 including treating said casting to remove surface imperfections and/or obtain desired shape before applying said protective coating.

3. A method according to claim 2 in which the treating operation is carried out by machining.

4. A method according to claim 1 in which coating is applied by placing said casting in a jacket.

5. A method according to claim 4 in which said jacket has an evacuation tube and said casting is evacuated during a heating step.

6. A method according to claim 1 in which said jacket is removed by machining.

7. A method according to claim 1 in which said jacket is removed by etching.

8. A method according to claim 1 in which the heating step prior to rolling is carried out in an inert atmosphere.

9. A method according to claim 1 in which the heating prior to rolling is carried out in a vacuum.

10. A method according to claim 1 in which the rolling step is carried out on heated rolls.

11. A method according to claim 10 in which the amount of reduction during rolling is 10 to 30 mils.

12. A method according to claim 10 in which the rolls are heated to a temperature of 250 to 350° F.

13. A method according to claim 1 in which rolling is also carried out in the transverse direction.

14. A method according to claim 1 in which below 100 mils reductions of 5 to 10 mils are taken during rolling.

15. A method according to claim 13 in which a balanced textile product is obtained.

16. A method according to claim 14 in which the wrought product obtained is sheet.

17. A method according to claim 1 in which the wrought product obtained is plate.

18. A method according to claim 1 in which the wrought product obtained is bar.

19. A method according to claim 1 in which the wrought product obtained is rod.

20. A method according to claim 1 in which the material contains beryllium, aluminum, silicon and copper.

References Cited
UNITED STATES PATENTS

| | | | |
|---|---|---|---|
| 3,234,652 | 2/1966 | Wikle | 148—11.5 F |
| 3,333,994 | 8/1967 | Mallen et al. | 148—11.5 F |
| 3,337,334 | 8/1967 | Fenn et al. | 75—150 |

CHARLES N. LOVELL, Primary Examiner

U.S. Cl. X.R.

29—527.5, 424; 148—11.5 F, 32